United States Patent [19]

Kolb et al.

[11] 4,207,047
[45] Jun. 10, 1980

[54] METHOD OF GENERATING PRESSURE IN A PRESS AND CIRCUIT FOR CARRYING OUT THE METHOD

[75] Inventors: Dieter Kolb, Stuttgart; Eugen Kopp, Stuttgart-Neugereut; Manfred Müller-Sybrichs, Schöckingen, all of Fed. Rep. of Germany

[73] Assignee: Werner & Pfleiderer, Stuttgart, Fed. Rep. of Germany

[21] Appl. No.: 913,381

[22] Filed: Jun. 7, 1978

[30] Foreign Application Priority Data

Jun. 8, 1977 [DE] Fed. Rep. of Germany ....... 2725804

[51] Int. Cl.$^2$ .............................................. B29C 3/06
[52] U.S. Cl. ...................................... 425/146; 425/149
[58] Field of Search ........................ 425/146, 155, 149

[56] References Cited

U.S. PATENT DOCUMENTS

| | | | |
|---|---|---|---|
| 3,299,476 | 1/1967 | McIlvin | 425/146 |
| 3,379,143 | 4/1968 | Kelley | 425/146 |
| 3,616,495 | 11/1971 | Lemelson | 425/155 |
| 3,661,483 | 5/1972 | Bose | 425/155 |
| 3,693,946 | 9/1972 | Merritt | 425/145 |
| 3,721,512 | 3/1973 | Ma et al. | 425/149 |
| 3,820,928 | 6/1974 | Lemelson | 425/146 |
| 3,893,792 | 7/1975 | Laczko | 425/149 |
| 3,894,824 | 7/1975 | Wells | 425/146 |

FOREIGN PATENT DOCUMENTS

2353960 7/1975 Fed. Rep. of Germany .

*Primary Examiner*—John A. Parrish
*Attorney, Agent, or Firm*—Browdy and Neimark

[57] ABSTRACT

A method for pressure buildup in a pressing cylinder of a press for a plastic or elastic material, wherein the material, under the influence of the advance of a plunger, is initially precompressed slowly to reach a pre-extrusion pressure and then the pressure is raised and adjusted to the extrusion pressure for the material and maintained at this level. The differential quotient of the pressure rise as a function of time is predetermined as a criterion for reaching the pre-extrusion pressure, and compression is carried out up to this point at a constant low plunger advance rate, with a constant rise in pressure thereafter up to the extrusion pressure.

A circuit for carrying out the method includes at least one valve incorporated in the hydraulic feed line to the hydraulic cylinder in which the piston is positioned. The valve is controllable initially by a volume sensor and then by a pressure-rise control means for the hydraulic fluid. A controlled controller-reverser is provided, which is connected downstream from a pressure-differential quotient converter connected to the hydraulic cylinder through a threshold value circuit.

9 Claims, 2 Drawing Figures

METHOD OF GENERATING PRESSURE IN A PRESS AND CIRCUIT FOR CARRYING OUT THE METHOD

FIELD OF THE INVENTION

This invention relates to a two-phase pressure generation in the pressing cylinder of a press, especially an extruding press, for plastic or elastic material. The material, under the influence of the forward stroke of a plunger, is initially precompressed slowly to reach a pre-extrusion pressure, and then the pressure is raised to the extruding pressure and then kept there. The invention is concerned with a method and a circuit for carrying out the method.

BACKGROUND OF THE INVENTION

It is known from German Auslegeschrift (Published Pat. Application No.) 2,353,960 to operate presses with two-stage pressure buildup, in order to shape at a lower pressure a rough-pressed body initially, prior to extrusion, without requiring a special rough press for the purpose.

For extruding plastic or elastic material, e.g., in extruding presses, it is known to raise the pressure very slowly at first after filling the pressing cylinder with the loose material to be molded, until a certain pre-extrusion pressure is reached in the material. Despite subjecting the material in the pressing cylinder to a vacuum, it has not been possible as a rule to prevent air inclusions from remaining; these air inclusions are then compressed quasi-adiabatically by an excessively rapid pressure increase caused by the forward advance of the plunger, and when the molded material emerges from the pressing cylinder, such inclusions destroy the molded body as a result of a sudden release of stress.

In order to avoid quasi-adiabatic compression phenomena of the type described, it is conventional, at least in the initial phase of the pressure buildup in the molding cylinder, to control manually a valve which influences the inflowing hydraulic fluid in such manner that initially only a very slow pressure rise occurs in the pressure cylinder.

SUMMARY OF THE INVENTION

An object of the invention is to automate the pressure buildup phase in the pressing cylinder in such manner as to eliminate sources of error resulting from human-related operating errors or differences in practical experience on the part of operating personnel.

The solution of the problem is based on the realization that is is very much a function of the degree of filling and the nature of the medium in the pressing cylinder, when a considerable pressure rise occurs as the plunger advances and how this pressure rise increases as a function of the forward movement of the plunger; while on the other hand the critical quasi-adiabatic compression, which must be avoided in all instances depends primarily on the pressure increase rate alone. Hence, it is not possible to adopt successfully the most obvious approach, namely, to initiate automatic control of the further advance of the plunger when a certain pressure is reached in the pressing cylinder, since, even before a certain starting pressure to initiate operation of an automatic pressure control is reached, the pressure increase rate may already have become inadmissably high.

In recognition of these facts, and the conclusion following therefrom, namely, that installation of an automatic pressure control in the pressing cylinder cannot be made dependent either upon the path traveled by the advancing plunger or on any pressure actually reached, the goal which forms the basis of the invention is achieved in a method of the type described hereinabove in such manner that the criterion for achieving the pre-extrusion pressure is a predetermined differential quotient of the pressure increase as a function of time, and compression is carried out up to this point at a constant slight advance rate of the plunger, followed by a constant pressure increase up to the extrusion pressure.

By virtue of this method according to the invention, automatic control circuits for building up the pressure in the pressing cylinder can be incorporated and, hence, regardless of the material being pressed at a given point in time, adiabatic phenomena relating to inclusions of residual air can be eliminated with considerable reliability. In the initial phase of movement of the pressing cylinder, no significant pressure develops in the material to be compressed, so that a critical pressure rise is realiably avoided, provided the advance rate of the pressing cylinder remains limited to a comparatively low value. It is not when an absolute pre-extrusion pressure is reached, but when a to-be-predetermined differential quotient of the pressure rise as a function of time is reached, that a transition is made to a thereafter constant maintenance of this just-reached pressure rate rise, until the extrusion pressure in the pressing cylinder is exceeded, whereupon this critical pressure rise rate, which, if possible, must not be exceeded in order to avoid adiabatic compression phenomena thereafter, can be preset differently, depending on the material to be compressed; it must be taken into account in this connection that it is sufficient in practice for many conventional molding materials, to give a value for the pressure-rise rate which is uniform and noncritical for all cases, so that adjustments to predetermined settings become necessary in this regard only in the case of unusual materials. As far as the initial stage of pressure buildup is concerned, it will be sufficient to move the plunger to predetermine the hydraulic fluid flowing into a hydraulic cylinder at a constant volume setting, since initially, a sufficiently constant advance rate is established for the plunger on the basis of a practically nonexistent counterpressure from the material to be compressed. Under unfavorable boundary conditions as far as the function os the press is concerned, or the material properties of the material to be compressed, or for the maximally exactly reproducible processes during pressure buildup within the pressing cylinder, it may be advantageous, however, to provide a liquid volume control in the hydraulic supply to the hydraulic cylinder according to a variant of the invention in order to achieve compression with a constant advance rate of the plunger.

According to an advantageous additional feature of the invention, the movement of the plunger, for a constant pressure rise rate after reaching the pre-extrusion pressure, is likewise controlled by influencing the feed of hydraulic fluid to the hydraulic cylinder, namely, by using a differential quotient as a function of time of the pressure increase in the hydraulic fluid as a measure of the actual value of the pressure rise as a function of time in the pressing cylinder and by influencing the amount of hydraulic fluid supplied to the hydraulic cylinder as a fixed parameter.

An advantageous arrangement for carrying out the method according to the invention is characterized by the fact that at least one valve is incorporated in the hydraulic feed line to the hydraulic cylinder of the plunger, this valve being controllable initially by a volume sensor and subsequently by a pressure-increase control for the hydraulic fluid, and by the fact that a controller-reverser is provided which is connected downstream from a pressure differential quotient converter connected to the hydraulic cylinder via a threshold value circuit.

The initially effective volume sensor can be designed simply as a volume limiter for the hydraulic fluid flowing into the hydraulic cylinder. Under the circumstances mentioned hereinabove, it may be more advantageous instead to use a complete volume regulator.

The volume sensor (in the form of a volume limiter or in the form of a volume regulator) and the pressure-rise regulator can act directly upon the same control valve in the hydraulic feed line.

In the interests of clearly distinguishably delimitable and if necessary interchangeable or separately adjustable individual functions of circuit arrangements, however, it may be more advantageous to provide two separate and independent valves between the hydraulic supply and the hydraulic cylinder in the hydraulic feed line, these valves being connected in series.

After incorporating the constant-pressure-rise control, the volume sensor can remain connected, in order to act continuously, namely as a volume limiter for the hydraulic feed line. According to an advantageous embodiment of the invention, in the interests of greater operating flexibility, provision can be made for switching over to a separate and if necessary electrical volume limiter.

In order to ensure an unambiguous switching from the constant advance rate of the plunger to a constant pressure rise in the pressing cylinder, according to an advantageous embodiment of the circuit according to the invention, a pressure-rise set-value sensor for the pressure increase regulator can be connected advantageously in the threshold circuit so that it functions simultaneously as a threshold sensor. This ensures that at precisely the moment that the pressure rise as a function of time must level off, the possibility of influence by the volume sensor is reduced to that of a volume limiter under extraordinary operating conditions and the further operation of the entire system in controlled operation is determined only by the pressure-rise regulator.

The threshold value circuit itself is advantageously made in the form of a two-point regulator, whereby the pressure differential quotient converter is simultaneously the actual value sensor for the pressure-rise regulator and the two-point regulator, with the result than when the rate of pressure rise goes above the set value for the two-point regulator, the regulator reverse switch is actuated and immediately activates the pressure-rise regulator. Regardless of the actual design of the volume sensor, it is advantageous as mentioned above to replace the former function of the volume sensor by changing over to a volume limiter for the hydraulic fluid when turning on the pressure-rise regulator through the regulator reverser; the action of the volume limiter is superimposed upon the function of the pressure-rise regulator as a safety measure. Under especially unfavorable conditions for a material to be compressed in the pressing cylinder, the possibility cannot be ruled out that discontinuity in the loading of the pressing cylinder, or similarly acting phenomena, when the desired pressure-rise rate has a constant setting, can result (even if only temporarily) in an undesirably rapid forward advance of the plunger, with the result that there will be considerable pressure variations when this movement is braked by a correspondingly sudden counterpressure. In case of such unfavorable operating conditions, the hydraulic fluid volume limiter ensures that a maximum feed rate for the pressing cylinder will not be exceeded, taking into account the fact that while the volume limiter is becoming effective, the pressure rise decreases as a function of time, but this is not a critical feature in view of the desired avoidance of adiabatic compression phenomena in the pressing cylinder.

On the basis of appropriate considerations, it may be advantageous in a practical embodiment of the circuit according to the invention to connect a limiting value monitor in parallel with the pressure-rise regulator for a critical limiting value which is exceeded by the actual pressure-rise value, even if only temporarily, due to variations in control, which limiting value for example reduces or blocks a further supply to the hydraulic cylinder by intervention of a valve which determines the volume of the incoming hydraulic fluid.

Since not inconsiderable operating times can intervene between the adjustment of the valves in the course of hydraulic supply and pressure variations in the material to the compressed in the pressing cylinder, it is advantageous to connect a limiting-value sensor of this type, not in the manner of a pressure differential quotient converter downstream from the actual-value sensor, but with appropriate consideration in the course of standardization when the limiting value sensor is being adjusted to connect the latter to the control output, in other words to feed it a signal through the control branch.

BRIEF DESCRIPTION OF THE DRAWINGS

Further features and advantages of the invention will be apparent from the following description of a preferred embodiment for a circuit for working the process according to the invention.

DETAILED DESCRIPTION OF EMBODIMENT

Figure 1:
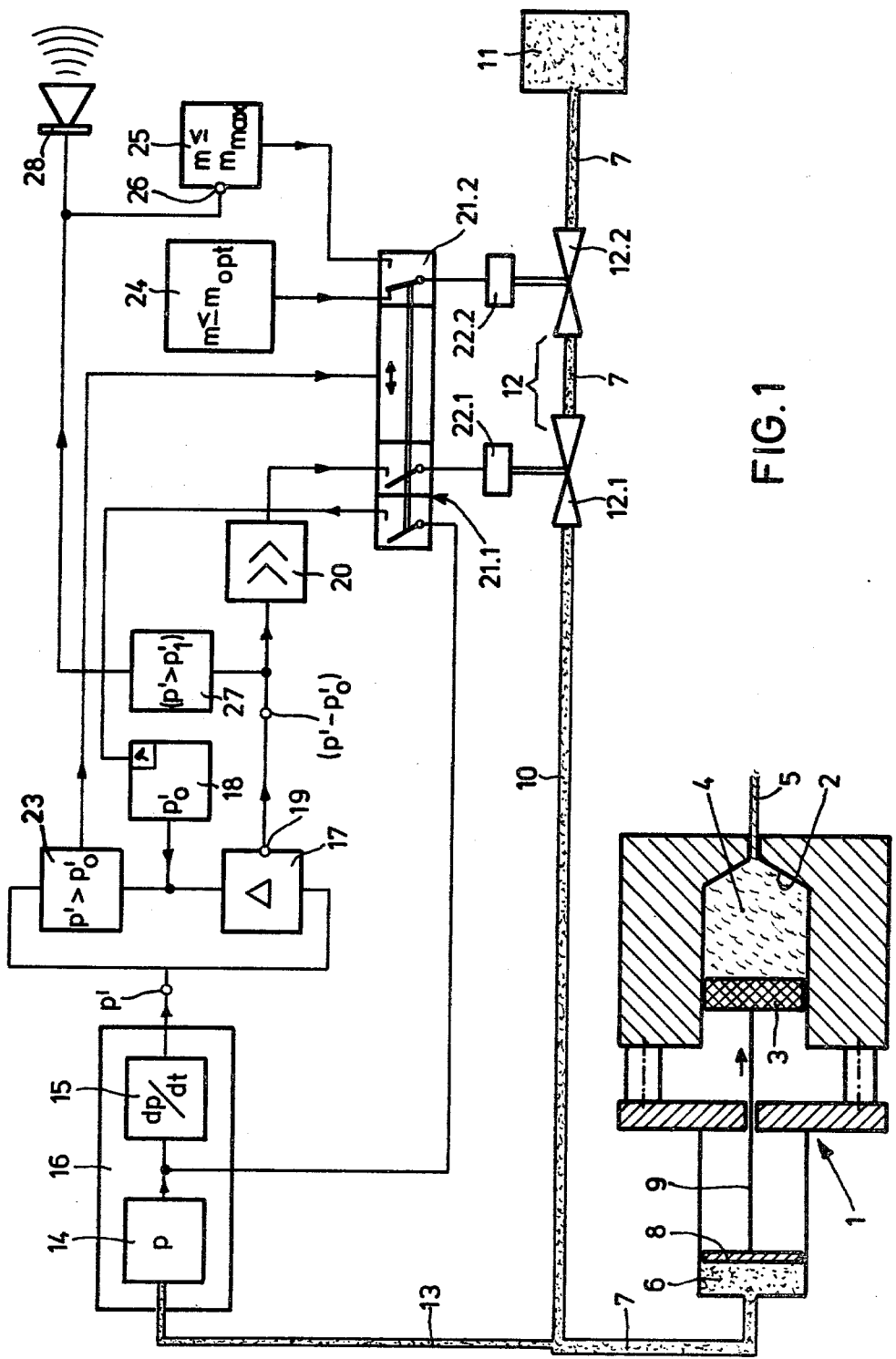
FIG. 1 is a simplified schematic diagram of a circuit according to the present invention for the operation of an extruding press.

In FIG. 1, bottom left, a schematic diagram of an extruding press 1 is shown in a symbolically simplified form. An extruding press 1 of the type and design in conjunction with which the preferred application area of the invention is viewed, is described in U.S. Pat. No. 3,689,188, incorporated herein in its entirety by preference, is used in particular for the extrusion of explosive materials, and it has a protective buffer device, which prevents destruction of the press in the event of inadmissibly increasing specific material pressures, in the form of a removable pressure vessel provided with intentionally weakened fracture point on the hydraulic cylinder. The pressure increase which takes place according to the invention is designed to ensure, however, that the response of such a protective device, which simply interferes with the continuity of the course of the method, remains limited to the occurrence of extreme and exceptional conditions.

The extrusion press 1 shown in simplified form in FIG. 1 includes, in a pressure cylinder 2, a plunger 3 for compressing and extruding a material 4 in order to produce for example a molded body 5. The plunger 3 is driven by a hydraulic cylinder 6 with an hydraulic fluid 7 under pressure, forcing an hydraulic piston 8, coupled via a press rod 9 to the plunger 3 of the press 1. The hydraulic cylinder 6 is connected via a hydraulic feed line 10 to a hydraulic fluid supply 11. At least one valve 12 for throttling the volume and/or pressure of the hydraulic fluid 7 pressurizing the hydraulic piston 8 is provided in the hydraulic feed line 10. In the preferred embodiment shown in FIG. 1, two valves 12.1 and 12.2 connected in series are incorporated into the hydraulic feed line 10, and are actuated by members associated with different functions in the circuit to be described further hereinbelow. The hydraulic supply 11 itself usually consists of pumps with accumulators located downstream, and is itself known per se.

An instantaneous pressure value p in material 4 to be compressed within the pressing cylinder 2 is measured by determining the instantaneous pressure p of hydraulic fluid 7 when it is introduced into hydraulic cylinder 6, a measurement line 13 being connected from the feed line 10 to a pressure sensor and converter 14. A differentiating element or differentiating quotient-former 15, located downstream from the converter 14 constitutes with it a pressure-differential quotient converter 16 whose output signal forms a first time derivative p' of a curve of the pressure p as a function of time t (see FIG. 2). Thus, the pressure-differential quotient converter 16 constitutes an actual-value sensor as a section of a control circuit for the pressure change rate in the hydraulic cylinder 6 and hence, in good approximation, in the material 4 within the pressing cylinder. A control element in the form of a difference amplifier 17 is connected downstream of the actual value sensor 16 and receives the p' signal therefrom, which amplifier 17 is also supplied with the output signal from a set-value-sensor 18. A set value for pressure change rate $p'_0$ is predetermined in the sensor 18, so that a control signal $p'-p'_0$ proportional to the deviation of the output signal of pressure-differential quotient converter 16 from the output signal of set-value-sensor 18 appears at an output terminal 19. After determining the instantaneous variation in control, in other words the output signal from amplifier 17, an electromechanical adjusting device 22.1 is controlled via an amplifier 20 and a first contact section 21.1 of a controller-reverser 21, whose reaction intervenes as a set value for the control circuit described via a first valve 12.1 as an adjusting element in the hydraulic feed line 10 which represents the actual control section.

The controller-reverser 21 is controllable by threshold value circuit 23, which produces an output signal whenever the instantaneous value of the pressure change rate p' reaches the set value $p'_0$ set on the set-value-sensor 18, in order to switch the amplifier 20 to a first electromechanical adjusting device 22.1.

On the other hand, a second contact section 21.2 is located between an electromechanical adjusting device 22.2 associated with a second valve 12.2 and a volume sensor 24. The latter can be a simple control circuit or a complete control circuit relative to the throughput volume m in hydraulic feed line 10. The example shown in FIG. 1 shows a control circuit with a limiter function, in other words when volume sensor 24 switches to the second electromechanical adjusting device 22.2, the adjustment of second valve 12.2 creates a situation in which the volume m of the hydraulic fluid 7 which is fed into hydraulic cylinder 6 does not exceed an optimum value $m_{opt}$.

In the preferred embodiment shown in FIG. 1, in the second switch position of controller-reverser 21, a volume limiter 25 becomes active via the second contact section 21.2, with the result that the adjustment of the second valve 12.2 which then occurs limits throughput m of hydraulic fluid 7 to a maximum value $m_{max}$.

When the volume limiter 25 is provided with an electrically adjustable limiting value, as shown in FIG. 1, an adjustment input terminal 26 is advantageously coupled to an output of a limiting value sensor 27, which in turn receives the actual value signal appearing at the output of the pressure-differential quotient converter 16 or as is shown in FIG. 1, with a branched output from the output terminal 19 of the difference amplifier 17. The limiting value sensor 27 controls a signalling device shown as a sound producer 28 when, as a result of disturbances in the operation of the amplifier 17 or due to critical unstable operating states, a sudden, undesirable pressure rise occurs in the material 4; at the same time, the volume m of the hydraulic fluid 7 supplied from the hydraulic cylinder 6 is throttled down to a perceptibly reduced maximum value $m_{max}$, by adjusting input to the terminal 26 of the volume limiter 25 by adjusting the second valve 12.2, with the result that further pressure increases in the pressing cylinder 12 are throttled or even entirely suppressed.

The operation of the circuit shown in FIG. 1 is described hereinbelow with reference to the simplified p/t diagram in FIG. 2. At the beginning of operation, at the origin of the system of coordinates in FIG. 2, no pressure is yet being exerted on the material 4 loaded into the pressing cylinder 2. The loaded material 4, for example to be shaped into the body 5 in the extrusion molding process, is ventilated in a known manner as described in more detail in the aforementioned U.S. Pat. No. 3,689,188, but is not taken into account in the schematic diagram shown in FIG. 1. Then, with control reverser 21 in the position shown in FIG. 1, the hydraulic plunger 8 is charged with the hydraulic fluid 7 under pressure, with the result that the plunger 3 moves to the right as shown in FIG. 1 and builds up a pressure slowly in the material 4. This movement of the plunger 3 takes place at an at least approximately constant advance rate, which is determined by the volume m of the hydraulic fluid 7 flowing in via the second valve 12.2 depending on the control exerted by the volume sensor 24. The constant advance rate v=const during this first operating phase, in the case of the material 4 and the press 1 which are encountered under practical conditions, is in the order of 1 mm/sec maximum.

For many practical cases it will be sufficient to design the volume sensor 24 as a simple adjustable control-signal generator, with the result that when a greater counter-pressure is generated in the mass of material 4, there will be a slighter decrease in the feed rate of the plunger 3. If this decrease in the advance rate must be avoided, the volume sensor 24 must be supplemented in a known fashion by adding an actual-value rate sensor for the movement of the plunger 3 into a closed control circuit, as is not shown separately in FIG. 1.

When the pressure-rise rate p' in the material 4 and hence in the hydraulic fluid 7 has reached a predetermined value, below which the danger of adiabatic compression phenomena of any remaining air inclusions in material 4 is still not present, the constant advance rate v=const of the plunger 3 will change over to operation with at least occasionally constant pressure-rise rate p'=const; then, at least initially, the pressure-rise rate $p'_0$ which is reached will be retained. This is accomplished by virtue of the fact that the threshold value switching circuit 23, which can be a simple comparison circuit for example, switches the controller-reverser 21 at this point in time $t_0$ (see FIG. 2). This reversal point $t_0$ for the change in the type of operation for advance of the plunger 3 therefore persists when an absolute pressure $P_0$ is reached, which can differ very considerably on the basis of the initial conditions of the filling phase of the pressing cylinder 2 and the material characteristics of the material 4, but can depend only on the reaching of a certain pressure-rise rate $p'=p'_0$ which is not critical for any adiabatic compression under certain conditions for residual air that remains within the material 4.

Then the loading of the hydraulic cylinder 6 with the hydraulic fluid 7 is influenced by the first valve 12.1, depending on the magnitude of the control variations $(p'-p'_0)$, at the output terminal 19 of the difference amplifier 17. By means of the amplifier 20 and the first electromechanical adjusting device 22.1, the first valve 12.1 is opened or closed to create a constant increase in the pressure rate p' in the material 4 at least approximately during time t, as shown in FIG. 2 with a solid curve. Typical values for operation in this second operating phase, in other words with constant compression, are between approximately p'=5 ... 50 bars/sec. The slope of the curves plotted in FIG. 2 in the range p'=const (therefore above $t_0$) can consequently be comparatively flat, but can also run comparatively steeply, as expressed by the bent double arrows on the curves shown in FIG. 2.

If the irregularities in the time behavior of subsequent pressure buildup within the material 4 take a form such that despite a further advance of the plunger 3, a pressure decrease occurs which would necessarily lead to a rapid opening of the first valve 12.1 because of its control function, there is a danger, which should be avoided if possible, for reasons of operating technology of the development of considerable control variations with corresponding brief overpressure. In order to avoid such rapid pressure variations, the second contact section 21.2 of the controller-reverser 21 in the reversed position (relative to the position shown in FIG. 1) ensures that the second valve 12.2 will not be ineffective during operation of the control circuit. Rather, by means of the volume limiter 25, the second valve 12.2 is now adjusted to a maximum throughput volume $m_{max}$, which prevents brief, overly strong influxes of the hydraulic fluid 7 into the hydraulic cylinder 6 from taking place, whereby, despite the control of the first valve 12.1, any brief transitional pressure peaks in the material 4 will be suppressed by output from the difference amplifier 17. When volume limiter 25 is operating in contrast to the idealized version shown in FIG. 2, there will not be a constant further increase in pressure p as a function of time t; this can be taken into account, however, because it is much more important for the rapid pressure increases not to cause any possible adiabatic compression phenomena in any residual air inclusions in the material 4.

Hence, under the influence of the control provided by the difference amplifier 17, provided the volume limiter 25 as described above does not intervene, a constant increase (over time t) in pressure p until extrusion pressure $P_A$ is reached takes place, at which point the material 4 is so strongly compressed that it leaves the pressing cylinder 2 as a molded element 5.

In practical use of the extruding press 1 of the type described herein, one cannot exclude completely the possibility that despite use of the system according to the invention, there might be a gradually increasing change in the pressure increase rate p' over the desired linear pressure rise, in other words on the basis of physical or chemical phenomena within the material 4 when exceeding a critical extrusion pressure p exerted by the plunger 3. Admittedly, one might think that the momentarily produced pressure p could be reduced by a reversal of the flow of the hydraulic fluid 7 in the feed line 10 in this case (not shown in FIG. 1); however, this would require considerable additional equipment over and above the standard equipment for the extruding press 1 in question, and it is questionable whether such an intervention for deliberate pressure decrease could be converted sufficiently rapidly into an increase in the effective volume in the pressing cylinder 2. Hence, when a critical pressure increase rate $p'_1$ over and above the desired constant pressure increase rate $p'_0$ adjusted by the set value sensor 18 is reached, provision has been made to connect the limiting value sensor 27, which controls the optical and/or acoustic warning signal device 28. Advantageously, the second valve 12.2 is throttled at the same time, while the volume limiter 25 through its adjustment input terminal 26 is adjusted to a significantly lower new maximum value $m_{max}$ for the influx of the hydraulic fluid 7, preferably even to a value of m=0, i.e., emergency shutoff of the hydraulic feed line 10. The limiting value sensor 27 which causes this can be supplied with the actual value signal p' from the pressure-differential quotient converter 16. It is provided in FIG. 1, however, that the control branch $(p'-p'_0)$ at control output terminal 19 can be used for controlling the limiting value sensor 27, in order to detect any unusual control signals to the amplifier 20 for influencing the first electromechanical adjusting devive 22.1 before this intervention makes itself felt in the control line and, on the basis of operating-time influences of the control system with corresponding delay, results in a variation in the actual pressure p which can be evaluated by the limiting value sensor 27.

The control-reverser 21 is shown only to increase the visibility of the multipole switch represented in FIG. 1 as mechanically coupled. In the embodiment of this circuit, as illustrated, it can be replaced by separately controllable electronic switches which, not necessarily directly, must also be connected ahead of the electromechanical adjustment devices 22.1 and 22.2, but can also switch, for example blocking inputs (not shown) to the difference amplifier 17, the volume sensor 24, and the volume limiter 25 using a blocking potential.

It is shown in the drawing that in the practical application of the invention it may be advantageous, after switching over to operation with a constant pressure-rise rate, not to maintain this rate continuously until extrusion pressure $p_A$ is reached, but rather to compress the material 4 at an intermittently constant pressure-rise rate p'. In the case of many materials 4 it has been found that an increase in the pressure drop rate following passage through an operating range with a moderate pressure-rise rate is not critical and such a transition to a higher pressure-rise rate shortly before reaching extrusion pressure $p_A$ results in a perceptible shortening of the work cycle of the press 1.

Figure 2:
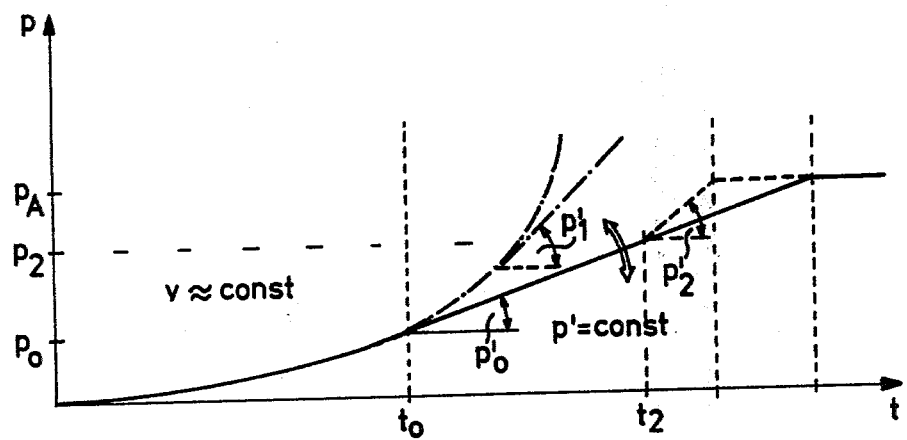
FIG. 2 shows a graph showing pressure as a function of time for compression of the material to be extruded in the pressing cylinder of the extruding press according to FIG. 1, taking into account the operation and influence of the circuit of FIG. 1.

Hence, provision is made in FIG. 1 to change over the set-value sensor 18 during operation of the control difference amplifier 17 as a function of the attainment of a predetermined pressure $p_2$ (see FIG. 2) to a higher set value $p_2'$ for the pressure-rise rate, as shown in FIG. 2, by the steeper slope of the dashed curves above point in time $t_2$, namely after reaching pressure $p_2$.

Such a conversion to a constant pressure-rise rate $p'$ with a different value during the second operating phase, in other words the operating phase with at least intermittently constant pressure rise, can also be carried out several times and/or as a function of other operating parameters, for example as a function of the attainment of a certain advance distance of the plunger 3 in the pressing cylinder 2.

It is to be appreciated that the accompanying drawings and foregoing discussion related to an embodiment of the circuit of the present invention, as well as variants thereof, are set out by way of example not by way of limitation. Numerous other embodiments and variants are possible without departing from the spirit and scope of the invention, its scope being defined in the appended claims.

What is claimed is:

1. In a circuit for effecting a two-phase pressure buildup in a cylinder of an extrusion press which includes a source of hydraulic fluid, a hydraulic cylinder and an extruding piston in the cylinder, the improvement, comprising a hydraulic fluid volume sensor, a pressure rise control means for hydraulic fluid and a hydraulic pressure rise set value sensor, wherein at least one value means is incorporated in a hydraulic feed line to said hydraulic cylinder of said extruding piston, said valve means being controllable initially by said volume sensor and then by said pressure-rise control means for hydraulic fluid, wherein a controlled controller-reverser is provided, which is connected downstream of a pressure-differential quotient converter connected to said hydraulic cylinder via a threshold value circuit which responds upon attainment of a desired hydraulic pressure increase rate and wherein said pressure rise set value sensor has its output coupled to said pressure-rise control means and to said threshold value circuit, as a threshold sensor.

2. An improved circuit according to claim 1, wherein said volume sensor comprises a volume limiter for throughput of hydraulic fluid through said valve means.

3. An improved circuit according to claim 1, wherein said volume sensor comprises volume control means for supplying hydraulic fluid to said hydraulic cylinder.

4. An improved circuit according to claim 1, wherein said valve means comprises two separate series-connected valves, one of said valves being controlled by said volume sensor, the other of said valves being controlled by said pressure rise control means.

5. An improved circuit according to claim 1, wherein said threshold value circuit comprises a two-point regulator having its input coupled to said pressure-differential quotient converter, as an actual-value sensor.

6. An improved circuit according to claim 1, wherein said controller-reverser turnes on a volume limiter whenever said volume sensor is shut off.

7. An improved circuit according to claim 6, including limiting value sensor means coupled to an output from said pressure-rise control means for producing a signal whenever the pressure exceeds a given level.

8. An improved circuit according to claim 7, wherein said limiting value sensor is connected to a reducing-adjusting input terminal of said volume limiter.

9. An improved circuit according to claim 7 or 8, wherein said limiting value sensor is connected to the output terminal of said pressure-rise control means.

* * * * *